US012689500B2

(12) United States Patent
Nagashima et al.

(10) Patent No.: US 12,689,500 B2
(45) Date of Patent: Jul. 21, 2026

(54) CRYPTOGRAPHIC COMMUNICATION SYSTEM, CRYPTOGRAPHIC COMMUNICATION DEVICE, CRYPTOGRAPHIC COMMUNICATION METHOD, AND CRYPTOGRAPHIC COMMUNICATION PROGRAM

(71) Applicants: KABUSHIKI KAISHA TOSHIBA, Tokyo (JP); TOSHIBA DIGITAL SOLUTIONS CORPORATION, Kawasaki (JP)

(72) Inventors: Yuki Nagashima, Tokyo (JP); Takeshi Sawazaki, Tokyo (JP); Hiroshi Kanome, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 260 days.

(21) Appl. No.: 18/493,284

(22) Filed: Oct. 24, 2023

(65) Prior Publication Data

US 2024/0250803 A1    Jul. 25, 2024

(30) Foreign Application Priority Data

Oct. 24, 2022    (JP) ................................ 2022-169651

(51) Int. Cl.
H04L 9/08            (2006.01)
(52) U.S. Cl.
CPC .......... H04L 9/0819 (2013.01); H04L 9/0852 (2013.01)
(58) Field of Classification Search
CPC ..... H04L 9/0897; H04L 9/0819; H04L 9/085; H04L 9/0894; H04L 63/0428;
(Continued)

(56) References Cited

U.S. PATENT DOCUMENTS 5,442,707 A * 8/1995 Miyaji .................. H04L 9/3247
                                                              713/180
7,079,650 B1 * 7/2006 Knudsen ................. G06F 7/725
                                                              708/492
(Continued)

FOREIGN PATENT DOCUMENTS

EP        3 541 007 A1    9/2019
JP        2004-194212 A    7/2004
(Continued)

OTHER PUBLICATIONS

Yoshimichi Tanizawa et al., "Quantum Key Distribution (QKD); Protocol and data format of REST-based key delivery API," ETSI GS QKD 014 V1.1.1, 22 pages (2019).

*Primary Examiner* — Sharif E Ullah
(74) *Attorney, Agent, or Firm* — Finnegan, Henderson, Farabow, Garrett & Dunner, LLP

(57)            ABSTRACT

According to one embodiment, a transmitting device includes an encryption key pre-fetching unit and an encryption chunk generation unit. The encryption key pre-fetching unit acquires the encryption key for encrypting plaintext data from a key management system before receiving the plaintext data. The encryption chunk generation unit generates a packet in which first encrypted data acquired by encrypting first plaintext data using a first encryption key and a first key ID of the first encryption key are stored, and a second key ID of a second encryption key used for encrypting second plaintext data transmitted after the first plaintext data, is embedded. A receiving device includes an encryption chunk analysis unit and a decryption key pre-fetching unit. The encryption chunk analysis unit analyzes the packet and reads the second key ID. The decryption key pre-fetching unit acquires the second encryption key corre- (Continued)

sponding to the second key ID read by the encryption chunk analysis unit from the key management system.

10 Claims, 10 Drawing Sheets

(58) Field of Classification Search
CPC ..... H04L 63/06; H04L 9/3242; H04L 9/3249; H04L 2209/60; H04L 9/14; H04L 2209/56; H04L 2209/805; H04L 63/061; H04L 9/0869; H04L 9/0822; H04L 9/0861; H04L 9/0891; H04L 9/3226; H04L 2209/38; G06F 16/27; G06F 16/252; G06F 16/2255; G06F 16/2272; G06F 16/273; G06F 16/275; G06F 16/2282; G06F 16/278; G06F 16/28; G06F 16/325; H04W 12/04; H04W 12/122; H04W 64/003; H04W 12/069
USPC ........ 713/171, 150, 163, 181; 726/2, 21, 36; 380/255, 264, 276
See application file for complete search history.

(56) References Cited

U.S. PATENT DOCUMENTS

| | | | | |
|---|---|---|---|---|
| 7,587,047 | B2 * | 9/2009 | Crandall | H04L 9/3252 |
| | | | | 380/263 |
| 9,584,320 | B1 * | 2/2017 | Parkinson | H04L 9/3066 |
| 10,805,081 | B1 * | 10/2020 | de Quehen | H04L 9/0844 |
| 10,812,265 | B1 * | 10/2020 | de Quehen | H04L 9/3013 |
| 12,212,663 | B1 * | 1/2025 | Carrel | H04L 9/088 |
| 2006/0059343 | A1 * | 3/2006 | Berzanskis | H04L 7/0008 |
| | | | | 713/171 |

| | | | | |
|---|---|---|---|---|
| 2006/0206793 | A1 * | 9/2006 | Komamura | G06F 21/6218 |
| | | | | 715/205 |
| 2008/0165955 | A1 * | 7/2008 | Ibrahim | H04L 9/0844 |
| | | | | 380/30 |
| 2011/0138475 | A1 * | 6/2011 | Gordon | H04L 9/0897 |
| | | | | 726/26 |
| 2011/0271344 | A1 * | 11/2011 | Unagami | G06F 21/554 |
| | | | | 726/23 |
| 2015/0142733 | A1 * | 5/2015 | Shadmon | G06F 16/21 |
| | | | | 707/769 |
| 2015/0172412 | A1 * | 6/2015 | Escriva | G06F 16/2471 |
| | | | | 709/202 |
| 2018/0001210 | A1 * | 1/2018 | Lin | A63F 13/352 |
| 2018/0060037 | A1 * | 3/2018 | Johnson | G06F 7/08 |
| 2019/0356650 | A1 * | 11/2019 | Leavy | H04L 63/06 |
| 2020/0081874 | A1 * | 3/2020 | Annamalai | G06F 16/22 |
| 2020/0242156 | A1 * | 7/2020 | Liu | G06F 16/83 |
| 2020/0336305 | A1 * | 10/2020 | Li | H04L 9/0844 |
| 2021/0075610 | A1 * | 3/2021 | Covaci | H04L 9/3066 |
| 2021/0194677 | A1 * | 6/2021 | Pourzandi | H04L 9/0822 |
| 2022/0006627 | A1 * | 1/2022 | Ko | H04L 9/0852 |
| 2022/0029797 | A1 * | 1/2022 | Tanaka | H04L 9/0861 |
| 2022/0054550 | A1 * | 2/2022 | Smith | A61P 35/00 |
| 2022/0150058 | A1 * | 5/2022 | Tanaka | H04L 9/0852 |
| 2023/0299953 | A1 * | 9/2023 | Doi | H04L 9/0852 |
| | | | | 380/255 |
| 2024/0137213 | A1 * | 4/2024 | De Santis | H04L 9/3066 |

FOREIGN PATENT DOCUMENTS

| | | |
|---|---|---|
| JP | 2005-12514 A | 1/2005 |
| JP | 2019-161557 A | 9/2019 |
| JP | 2021-510262 A | 4/2021 |
| JP | 2022-75196 A | 5/2022 |

* cited by examiner

1231

| DATA NAME | FORMAT |
|---|---|
| KEY ID | UUID FORMAT OR INTEGER VALUE |
| KEY DATA | BYTE SEQUENCE OF RANDOM NUMBERS |
| OFFSET INFORMATION | INTEGER VALUE |

| DATA NAME | FORMAT |
|---|---|
| KEY ID | UUID FORMAT |
| KEY DATA | BYTE SEQUENCE OF RANDOM NUMBERS ENCODED IN Base64 |

FIG. 12

| DATA NAME | FORMAT |
|---|---|
| ENCRYPTED PAYLOAD | ENCRYPTED AUDIO AND VIDEO CHUNKS |
| DECRYPTION KEY ID | UUID FORMAT OR INTEGER VALUES (MULTIPLE) |
| OFFSET INFORMATION | INTEGER VALUES (MULTIPLE) |
| THE NUMBER OF DECRYPTION KEY IDs | INTEGER VALUE |
| LIST OF PRE-FETCHING KEY IDs | UUID FORMAT OR INTEGER VALUES (MULTIPLE) |
| THE NUMBER OF PRE-FETCHING KEY IDs | INTEGER VALUE |

CRYPTOGRAPHIC COMMUNICATION SYSTEM, CRYPTOGRAPHIC COMMUNICATION DEVICE, CRYPTOGRAPHIC COMMUNICATION METHOD, AND CRYPTOGRAPHIC COMMUNICATION PROGRAM

CROSS-REFERENCE TO RELATED APPLICATION(S)

This application is based upon and claims the benefit of priority from Japanese Patent Application No. 2022-169651, filed Oct. 24, 2022, the entire contents of which are incorporated herein by reference.

FIELD

Embodiments described herein relate generally to a cryptographic communication system, a cryptographic communication device, a cryptographic communication method, and a cryptographic communication program.

BACKGROUND

A method is known for performing secure cryptographic communication such as one-time pad (OTP) communications by using random numbers shared between two sites using quantum key distribution (QKD) technology as a common key (encryption key and decryption key).

As a method of speeding up the communication of a cryptographic communication application (cryptographic communication device) using this QKD, a method of pre-fetching an encryption key before receiving plaintext and pre-fetching a decryption key before receiving ciphertext is proposed.

Also, as a method of providing a shared key that uses QKD to the cryptographic communication application, a method of installing a key management system is known. "ETSI GS QKD 014" is a representative interface specification that defines key exchange between this key management system and the cryptographic communication application.

In this interface, first, a key ID is assigned along with the encryption key, and when acquiring the decryption key, the corresponding decryption key can be acquired by specifying the same key ID of the encryption key. Therefore, after acquiring the key from the key management system, the encryption device needs to give notification of the key ID to the decryption device, using some method.

Examples of related art include JP-A-2019-161557, and European Telecommunications Standards Institute: ETSI GS QKD 014 V1.1.1, 2019-02, p. 10.

DESCRIPTION OF THE DRAWINGS

FIG. 12 is a diagram showing an example of a data table of an encryption chunk generated by the encryption processing unit in FIG. 1.

DETAILED DESCRIPTION

Figure 1:
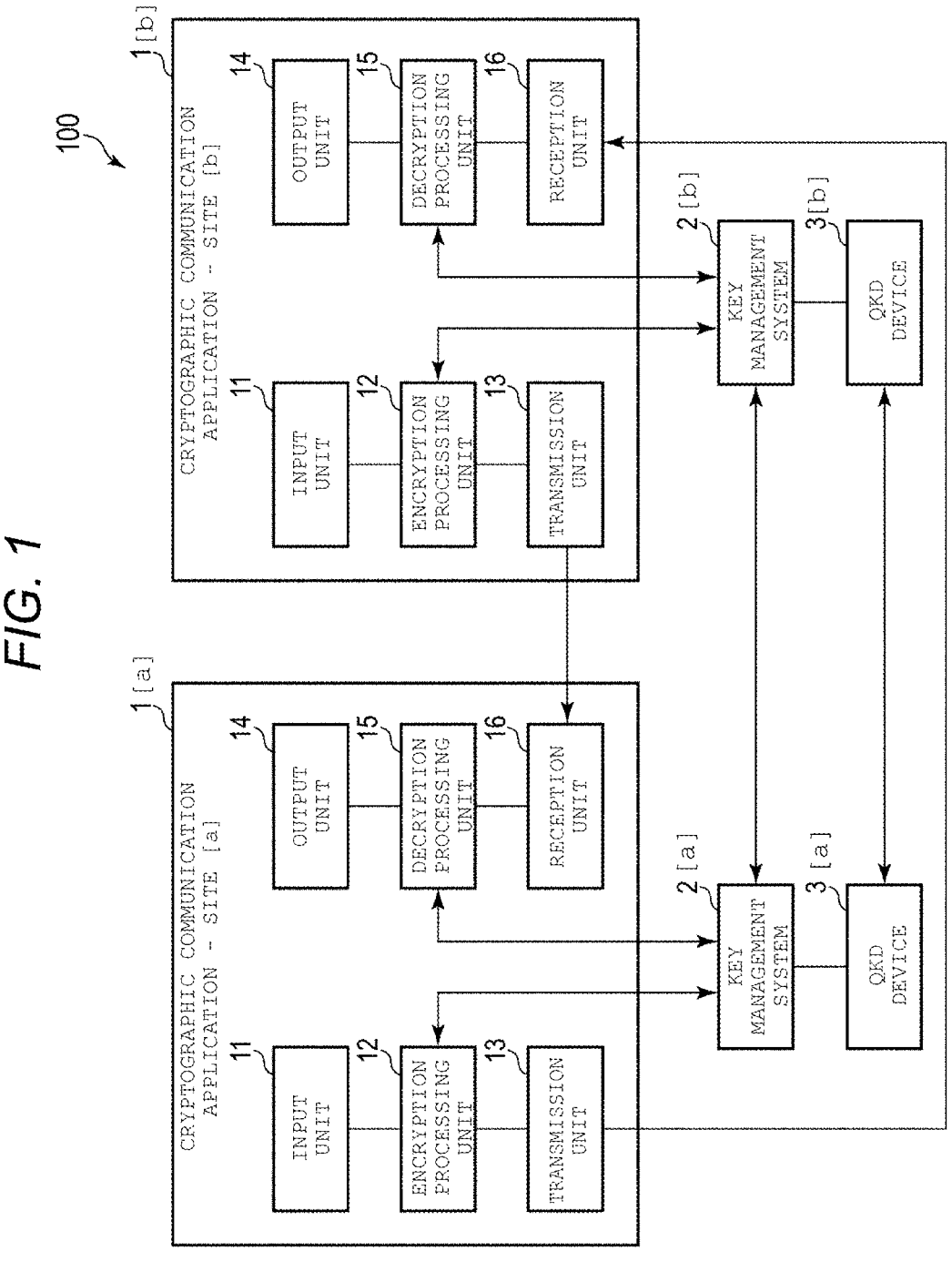
FIG. 1 is a diagram showing a configuration example of a cryptographic communication system according to an embodiment.

A key acquisition interface conforming to "ETSI GS QKD 014" has a characteristic that a key ID is required to acquire a decryption key. Therefore, in order to achieve key pre-fetching in combination with a key management system that adopts the same interface (or a key acquisition interface with a similar characteristic), it is necessary for the communication application on the encryption side to give notification of a key ID to the communication application on the decryption side before pre-fetching the key.

Therefore, a method of pre-fetching a key in combination with the key management system that adopts the key acquisition interface conforming to "ETSI GS QKD 014" has disadvantages such as requiring a communication protocol for key ID notification, and creating additional network requirements (such as allowing communication ports through firewalls), making it difficult to utilize this method in communication applications.

Embodiments of the present disclosure provide a cryptographic communication system, a cryptographic communication device, a cryptographic communication method, and a cryptographic communication program that can achieve high-speed communication by key pre-fetching without requiring a communication protocol for key ID notification or the like.

In general, according to one embodiment, a cryptographic communication system uses a key management system that has an interface giving notification of a key ID when providing an encryption key, and returns the encryption key corresponding to the key ID in response to a request for the encryption key for which the key ID is specified, and which shares the encryption key between a first site and a second site by quantum key distribution technology that executes cryptographic communication between a transmitting device that acquires the encryption key managed by the key management system from the first site and a receiving device that acquires the encryption key managed by the key management system from the second site. The transmitting device includes an encryption logic, an encryption key pre-fetching unit, an encryption key memory unit, and an encryption chunk generation unit. The encryption logic uses the encryption key acquired from the key management system to encrypt plaintext data. The encryption key pre-fetching unit acquires the encryption key for encrypting plaintext data from the key management system before receiving the plaintext data. The encryption key memory unit memorizes the encryption key acquired by the encryption key pre-fetching unit along with the key ID. The encryption chunk generation unit generates a packet in which first encrypted data acquired by the encryption logic that uses a first encryption key to encrypt first plaintext data and a first key ID of the first encryption key are stored, and a second key ID of a second encryption key memorized in the encryption key memory unit, which is used for encrypting second plaintext data transmitted after the first plaintext data, is embedded. The receiving device includes a decryption logic, an encryption chunk analysis unit, a decryption key pre-fetching unit, and a decryption key memory unit. The decryption logic uses the encryption key acquired from the key management system to decrypt encrypted data. The encryption chunk analysis unit analyzes the packet to read the second key ID. The decryption key pre-fetching unit acquires the second encryption key corresponding to the second key ID read by the encryption chunk analysis unit from the key management system. The decryption key memory unit memorizes the encryption key acquired by the decryption key pre-fetching unit along with the key ID.

Hereinafter, embodiments will be described with reference to the drawings.

FIG. 1 is a diagram showing a configuration example of a cryptographic communication system 100 according to an embodiment.

Cryptographic communication application 1[a] and cryptographic communication application 1[b] are programs executed on different computers that encrypt input data and transmit the encrypted data to each other. Here, a remote conference is held between site [a] and site [b], and the cryptographic communication application 1[a] running on a computer at site [a] encrypts the input audio (vocal sound at site [a]) and video (captured image at site [a] or image displayed on a computer) and transmits the encrypted audio and video as encrypted data to the cryptographic communication application 1[b] running on a computer at site [b], while upon receiving this encrypted data, the cryptographic communication application 1[b] decrypts the encrypted data and outputs the original audio and video. In addition, in parallel with this, the cryptographic communication application 1[b] encrypts the input audio and video and transmits the encrypted audio and video as encrypted data to the cryptographic communication application 1[a], while upon receiving the encrypted data, the cryptographic communication application 1[a] decrypts the encrypted data and outputs the original audio and video. Audio and video are assumed to be cryptographic communication targets, but the cryptographic communication system 100 of the present embodiment can handle various types of data other than audio and video, such as data in document files or CSV files.

Also, here, the cryptographic communication application 1, which is a program executed on a computer, is exemplified as the cryptographic communication device that executes cryptographic communication, but the cryptographic communication device may be implemented as dedicated hardware equipment.

The cryptographic communication application 1 acquires an encryption key for encrypting audio and video and a decryption key for decrypting the encrypted data from a key management system 2. More specifically, the cryptographic communication application 1[a] acquires an encryption key and a decryption key from a key management system 2[a], and the cryptographic communication application 1[b] acquires an encryption key and a decryption key from a key management system 2[b]. Here, for example, the encryption key used by the cryptographic communication application 1[a] for encrypting the audio and video, and the decryption key used by the cryptographic communication application 1[b] for decrypting the encrypted data encrypted using this encryption key are the same key. That is, the cryptographic communication application 1[a] and the cryptographic communication application 1[b] perform encryption and decryption using a common key cryptosystem. Hereinafter, the key (decryption key) used by the cryptographic communication application 1 to decrypt the encrypted data may also be referred to as a common key, and may also be referred to as an encryption key (used for encrypting the audio and video).

The key management system 2[a] shares a common key with another key management system 2[b] through a QKD device 3[a]-[b] that executes quantum key distribution, and assigns this common key into an encryption key and a decryption key to provide the cryptographic communication application 1. Quantum key distribution (QKD) is a technology that uses the behavior of photons, and the QKD device 3[a] uses an optical fiber (or vacuum) as a medium, to communicate information such as random numbers for generating a common key using photons to another QKD device 3[b]. When wiretapping occurs on the propagation path (medium) of photons, the behavior of photons changes, so the QKD device 3[a]-[b] can detect wiretapping.

The key management system 2 has a key acquisition interface conforming to, for example, the "ETSI GS QKD 014", which requires specification of a key ID when acquiring a decryption key. For example, when transmitting the encrypted data (encrypted audio and video) from the cryptographic communication application 1[a] to the cryptographic communication application 1[b], the cryptographic communication application 1[a] requests an encryption key from the key management system 1[b]. Upon receiving this request, the key management system 2[a] provides the encryption key to the cryptographic communication application 1[a] along with the key ID of the encryption key. The cryptographic communication application 1[a] uses the provided encryption key to encrypt the audio and video, and transmits the acquired encrypted data to the cryptographic communication application 1[b].

Meanwhile, the cryptographic communication application 1[b] acquires a decryption key for decrypting the encrypted data received from the cryptographic communication application 1[a] from the key management system 2[b]. When acquiring this decryption key, the cryptographic communication application 1[b] specifies the key ID and requests the decryption key corresponding to the key ID to the key management system 2[b]. Therefore, the cryptographic communication application 1[a] needs to give notification of the key ID of the encryption key used for encrypting the audio and video to the cryptographic communication application 1[b], using some method. The same applies to a case of transmitting the encrypted data (encrypted audio and video) in the reverse direction, which is from the cryptographic communication application 1[b] to the cryptographic communication application 1[a].

Therefore, the cryptographic communication system 100 of the present embodiment has a mechanism that does not require a communication protocol for key ID notification or the like in achieving key pre-fetching for high-speed communication while using the key management system having an interface that requires a key ID to acquire a decryption key, and this point will be described in detail below.

First, the configuration of the cryptographic communication application 1 will be described. As shown in FIG. 1, the cryptographic communication application 1 includes an input unit 11, an encryption processing unit 12, a transmission unit 13, an output unit 14, a decryption processing unit 15, and a reception unit 16.

The input unit 11 encodes audio and video input from a computer's microphone or camera. As described above, however, the cryptographic communication system 100 of the present embodiment is not limited to audio or video data, but can handle various types of data input for cryptographic communication. Consequently, various other types of data, such as data in document files or CSV files, may be input to the input unit 11.

The encryption processing unit 12 encrypts data, such as video and audio signals (plaintext data) encoded by the input unit 11.

The transmission unit 13 transmits the video and audio signals encrypted by the encryption processing unit 12 to another cryptographic communication application 1.

The output unit 14 outputs the video and audio signals decrypted by the decryption processing unit 15 through the speaker or display of the computer.

The decryption processing unit 15 decrypts the video and audio signals received by the reception unit 16 from another cryptographic communication application 1.

Figures 2, 3:
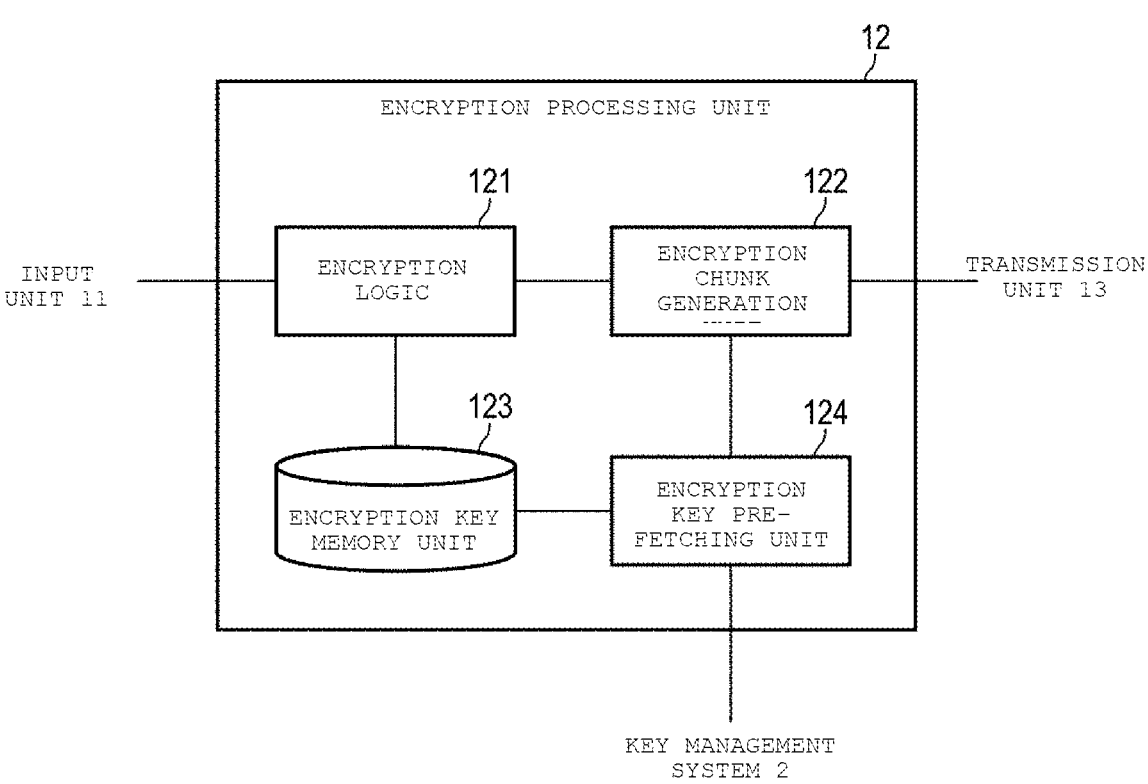
FIG. 2 is a functional block diagram of an encryption processing unit in FIG. 1.
FIG. 3 is a diagram showing an example of a data table memorized in an encryption key memory unit in FIG. 1.

FIG. 2 is a functional block diagram of the encryption processing unit 12.

As shown in FIG. 2, the encryption processing unit 12 includes an encryption logic 121, an encryption chunk generation unit 122, an encryption key memory unit 123, and an encryption key pre-fetching unit 124. Also, the encryption processing unit 12 is connected to the input unit 11, the transmission unit 13, and the key management system 2.

The encryption logic 121 uses the encryption key memorized in the encryption key memory unit 123 to encrypt the audio and video input by the input unit 11.

The encryption chunk generation unit 122 formats the encrypted data output from the encryption logic 121 as an encryption chunk (packet). The details of the encryption chunk generation unit 122 will be described later. The encryption chunk generation unit 122 inputs the encryption chunk to the transmission unit 13.

The encryption key memory unit 123 is an area, such as a main memory, that allows fast access from the encryption logic 121. The encryption key memory unit 123 memorizes data, such as data represented in a data table 1231 shown in FIG. 3.

As shown in FIG. 3, the data table 1231 includes a key ID field, a key data field, and an offset information field.

The key ID is an identifier for uniquely identifying the encryption key managed by the key management system 2.

The key data is the encryption key acquired by the encryption key pre-fetching unit 124 (as described later) from the key management system 2 along with the key ID, and is, for example, a random number sequence.

The offset information indicates the position of the used byte when only the required size of byte sequence is extracted from the key data and used for encryption processing, and the remaining byte sequence is used for the next encryption processing.

Before the audio and video (or other type of data) are input from the input unit 11, the encryption key pre-fetching unit 124 acquires the encryption key for encrypting the audio and video from the key management system 2 along with the key ID. The details of the encryption key pre-fetching unit 124 will be described later. The encryption key and the key ID acquired by the encryption key pre-fetching unit 124 are stored in the data table 1231 of the encryption key memory unit 123.

Figure 4:
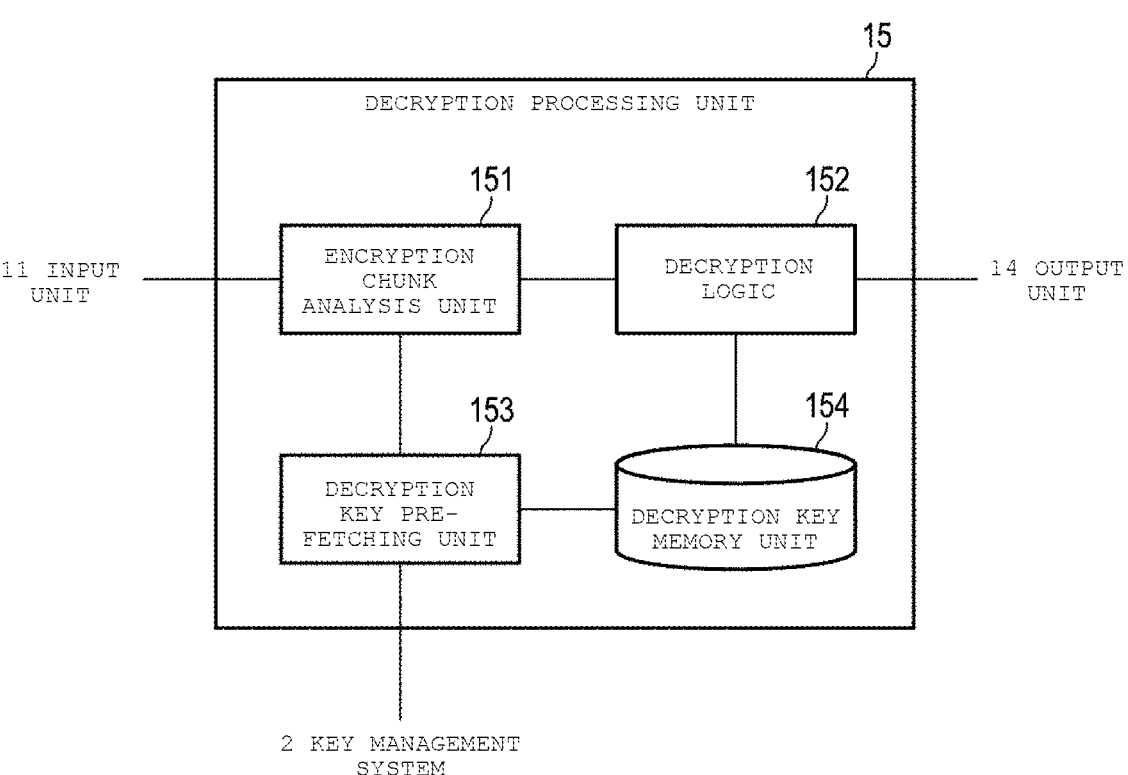
FIG. 4 is a functional block diagram of a decryption processing unit in FIG. 1.

FIG. 4 is a functional block diagram of the decryption processing unit 15.

As shown in FIG. 4, the decryption processing unit 15 includes an encryption chunk analysis unit 151, a decryption logic 152, a decryption key pre-fetching unit 153, and a decryption key memory unit 154. Also, the decryption processing unit 15 is connected to the reception unit 16, the output unit 14, and the key management system 2.

The encryption chunk analysis unit 151 analyzes the encryption chunk received by the reception unit 16 to acquire a key ID of the decryption key for decrypting the encrypted data transmitted in the encryption chunk and a key ID of the decryption key to be pre-fetched, which is for decrypting the encrypted data expected to be transmitted after the encrypted data transmitted in the encryption chunk. The details of the encryption chunk analysis unit 151 will be described later. The encryption chunk analysis unit 151 transfers the encrypted data and the key ID of the decryption key for decrypting the encrypted data transmitted in the encryption chunk to be analyzed to the decryption logic 152, and transfers the key ID of the decryption key to be pre-fetched, which is for decrypting the encrypted data expected to be transmitted after the encrypted data transmitted in the encryption chunk, to the decryption key pre-fetching unit 153.

The decryption logic 152 acquires the decryption key corresponding to the key ID received from the encryption chunk analysis unit 151 from the decryption key memory unit 154, and uses the decryption key to decrypt the encrypted data also received from the encryption chunk analysis unit 151. The decryption logic 152 transfers the audio and video acquired by decrypting the encrypted data to the output unit 14.

The decryption key pre-fetching unit 153 acquires the decryption key corresponding to the key ID received from the encryption chunk analysis unit 151 from the key management system 2. The decryption key acquired by the decryption key pre-fetching unit 153 is stored in a data table 1541 as described later, in the decryption key memory unit 154 along with the key ID.

The decryption key memory unit 154 is an area, such as a main memory, that allows fast access from the decryption logic 152. The decryption key memory unit 154 memorizes the data table 1541 that stores the decryption key acquired by the decryption key pre-fetching unit 153 along with the key ID. The data table 1541 has the same structure as the data table 1231 (see FIG. 3).

Figure 5:
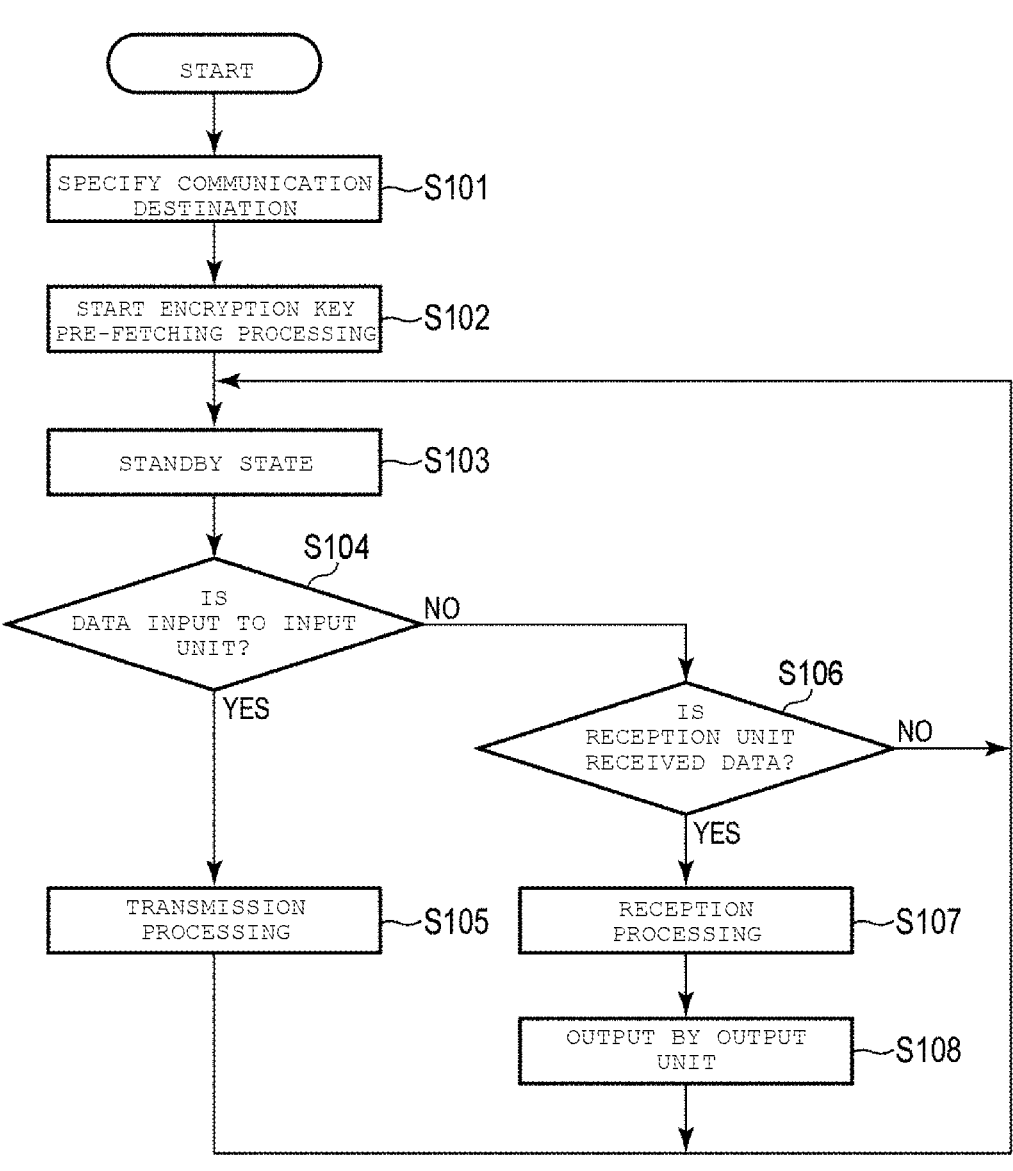
FIG. 5 is a flowchart showing processing of the cryptographic communication system according to an embodiment.

FIG. 5 is a flowchart showing processing of the cryptographic communication application 1.

When starting up, the cryptographic communication application 1 receives a specification from the user to use the cryptographic communication application 1 and the key management system 2 as communication destinations (step S101).

Subsequently, in the cryptographic communication application 1, the encryption key pre-fetching unit 124 of the encryption processing unit 12 starts pre-fetching of the key from the specified key management system 2 (step S102). The pre-fetching of the key from the key management system 2 by this encryption key pre-fetching unit 124 is continuously executed while the cryptographic communication application 1 is running.

Thereafter, the cryptographic communication application 1 is in a standby state until data is input to the input unit 11 or the reception unit 16 (step S103), and when audio and video are input to the input unit 11 from microphone and camera of the computer (step S104: YES), executes transmission processing (step S105), and when the reception unit 16 receives the encrypted data from another cryptographic communication application 1 (step S106: YES), executes reception processing (step S107) and output by the output unit 14 (step S108). When the transmission processing (step S105) or the reception processing (step S107) and the output by the output unit 14 (step S108) are completed, the cryptographic communication application 1 returns to the standby state (step S103).

Next, the details of the encryption key pre-fetching processing starting in step S102, the transmission processing in step S105, and the reception processing in step S107 will be described below.

Figures 6, 7:
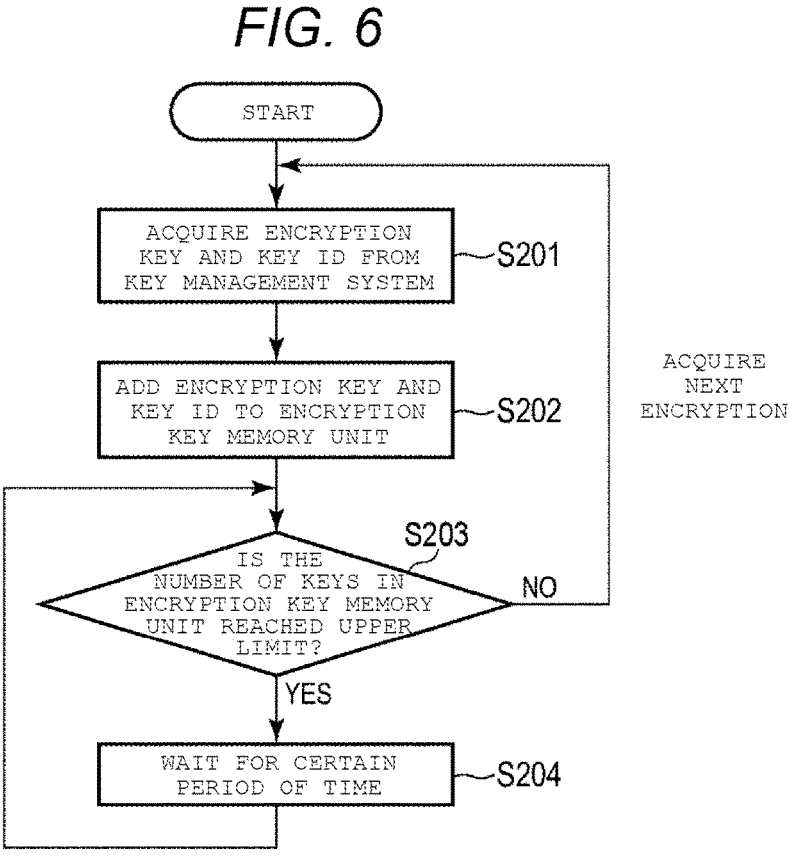
FIG. 6 is a flowchart showing the details of encryption key pre-fetching processing by an encryption key pre-fetching unit in FIG. 2.
FIG. 7 is a diagram showing an example of a data format of an encryption key and a key ID that the encryption key pre-fetching unit in FIG. 2 acquires from a key management system.

FIG. 6 is a flowchart showing the details of the encryption key pre-fetching processing by the encryption key pre-fetching unit 124.

The encryption key pre-fetching unit 124 first uses a communication protocol such as ETSI GS QKD 014 to acquire an encryption key and a key ID from the key management system 2, as an example (step S201). Information, such as the connection destination, required at this time has already been input in step S101 of the flowchart of the cryptographic communication application shown in FIG. 5.

The encryption key pre-fetching unit 124 acquires the encryption key and the key ID, for example, in the data format shown in FIG. 7 from the key management system 2, and adds the encryption key and the key ID to the encryption key memory unit 123 (stored in the data table 1231) in the data format shown in FIG. 3 (step S202). At this time, the encryption key pre-fetching unit 124 decodes the key data from the Base64 format into the original byte sequence, and sets the offset information to 0. Also, the encryption key pre-fetching unit 124 may convert the key ID from the UUID format to an integer value.

At this point, the encryption key pre-fetching unit 124 checks the number of keys stored in the encryption key memory unit 123 and compares the number of keys with a predetermined upper limit number (step S203). When the number of keys reaches the upper limit (step S203: YES), the encryption key pre-fetching unit 124 suspends processing, stands by for a certain period of time (step S204), and then returns to step S203 to check the number of keys again. When the number of keys does not reach the upper limit (step S203: NO), the encryption key pre-fetching unit 124 repeats step S201 and subsequent steps.

Figure 8:
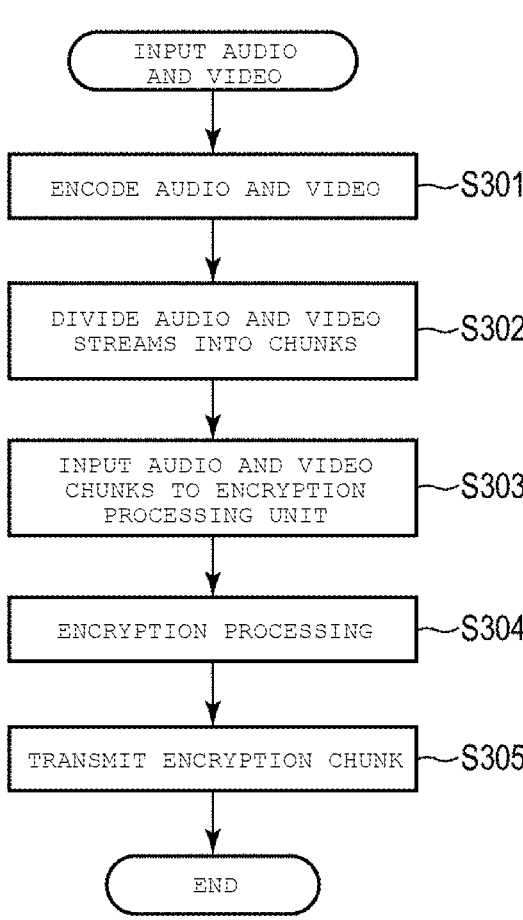
FIG. 8 is a flowchart showing the details of transmission processing of the cryptographic communication system according to an embodiment.

FIG. 8 is a flowchart showing the details of the transmission processing (FIG. 5: step S105) of the cryptographic communication application 1.

First, when inputting audio and video, the input unit 11 encodes the audio and video to generate video and audio streams (step S301). Furthermore, the input unit 11 divides the streams into pieces (chunks) in units of time, frame, or the like (step S302). This is called streaming processing, and is a general processing when transferring video and audio in real time.

Subsequently, the input unit 11 inputs the audio and video divided into chunks to the encryption processing unit 12 (step S303).

The encryption processing unit 12 performs encryption processing (FIG. 8) as described later, on the provided audio and video, and then formats the encrypted data as an encryption chunk (FIG. 12) as described later (step S304).

After that, the transmission unit 13 transmits the encryption chunk (step S305). Any communication protocol can be used at this time. For example, Real-time Transport Protocol (RTP) or Secure Real-time Transport Protocol (SRTP) may be used.

Figure 9:
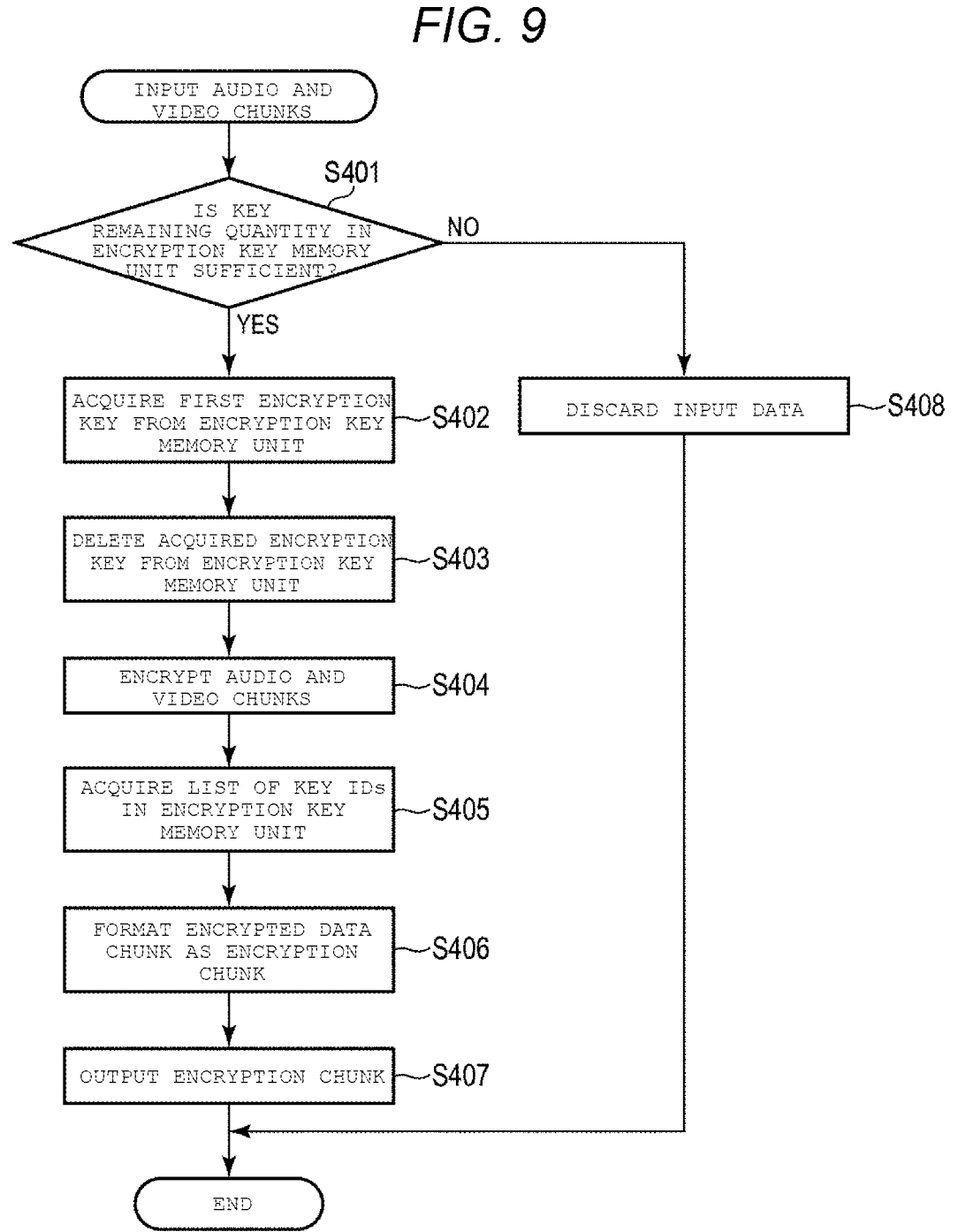
FIG. 9 is a flowchart showing the details of encryption processing by the encryption processing unit in FIG. 1.

FIG. 9 is a flowchart showing the details of the encryption processing by the encryption processing unit 12.

First, when receiving audio and video chunks, the encryption processing unit 12 checks whether key data of the required length for encryption is accumulated in the encryption key memory unit 123 (step S401).

When there is sufficient key data in the encryption key memory unit 123 (step S401: YES), the encryption processing unit 12 acquires an encryption key from the encryption key memory unit 123 (step S402), and the encryption processing unit 12 either deletes the acquired encryption key from the encryption key memory unit 123 or updates the offset information when only a part of the byte sequence in the encryption key is acquired (step S403).

Subsequently, the encryption processing unit 12 encrypts the audio and video chunks using the encryption logic 121 (step S404). The encryption logic 121 acquires a list of key IDs in the encryption key memory unit 123 (step S405). This is because the key IDs are added (embedded) as pre-fetching key IDs when formatting an encryption chunk (FIG. 12) as described later, in subsequent processing, that is, in detail, in the processing by the encryption chunk generation unit 122 (step S406) as described later. The encryption processing unit 12 uses the encryption chunk generation unit 122 to format the encryption chunk (step S406), finally outputs the encryption chunk to the transmission unit 13 (step S407), and ends the encryption processing.

On the other hand, when there is not sufficient key data in the encryption key memory unit 123 (step S401: NO), the encryption processing unit 12 discards the input data (step S408) and ends the encryption processing. Meanwhile, when the delay time caused by the encryption processing is not an issue, the encryption processing unit 12 may wait for key data to accumulate and then retry step S401.

Figure 10:
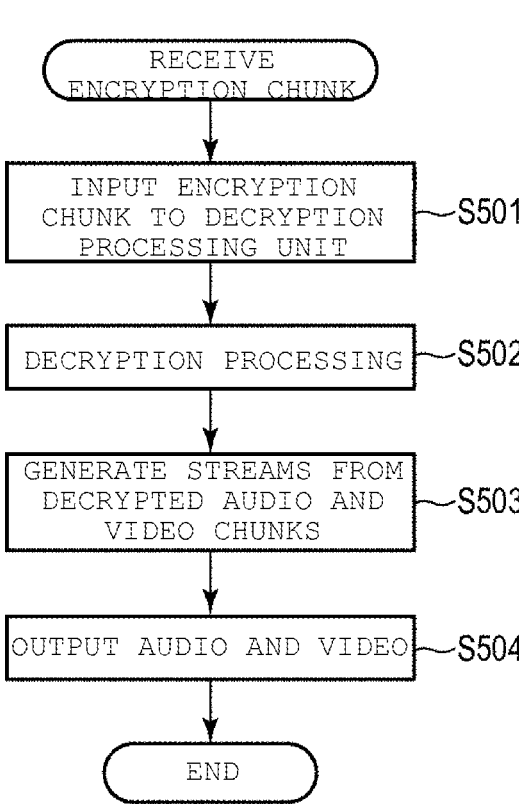
FIG. 10 is a flowchart showing the details of reception processing of the cryptographic communication system according to an embodiment.

FIG. 10 is a flowchart showing the details of the reception processing (FIG. 5: step S107) of the cryptographic communication application 1.

First, when the reception unit 16 receives an encryption chunk, the encryption chunk is input to the decryption processing unit 15 (step S501). The decryption processing unit 15 performs decryption processing on the input encryption chunk to generate audio and video chunks (step S502).

Subsequently, the decryption processing unit 15 generates streams from the audio and video chunks (step S503). The decryption processing unit 15 transfers the generated streams to the output unit 14.

When receiving the streams from the decryption processing unit 15, the output unit 14 outputs the audio through the speaker and displays the video on the display (step S504).

Figure 11:
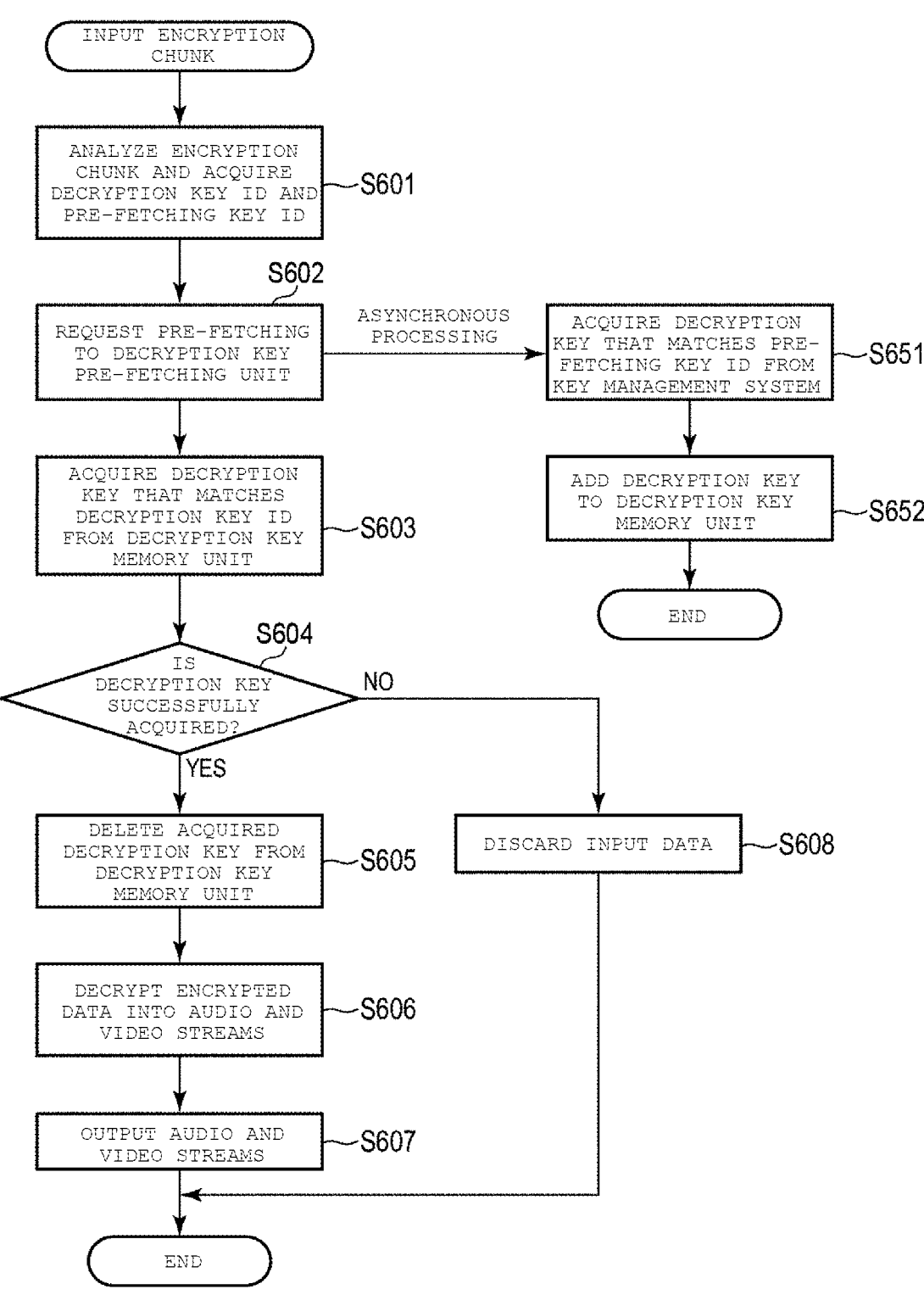
FIG. 11 is a flowchart showing the details of decryption processing by the decryption processing unit in FIG. 1.

FIG. 11 is a flowchart showing the details of the decryption processing by the decryption processing unit 15.

First, when receiving an encryption chunk, the decryption processing unit 15 analyzes the encryption chunk by the encryption chunk analysis unit 151 and acquires a decryption key ID and a pre-fetching key ID (step S601).

Subsequently, the decryption processing unit 15 gives notification of the acquired pre-fetching key ID to the decryption key pre-fetching unit 153, and requests pre-fetching of the decryption key (step S602). Upon receiving the request, the decryption key pre-fetching unit 153 acquires the decryption key that matches the pre-fetching key ID from the key management system 2 (step S651). The procedure for storing the acquired decryption key in the decryption key memory unit 154 is the same as the procedure described in details of the encryption key pre-fetching processing by the encryption key pre-fetching unit 124 (see FIG. 6).

This decryption key pre-fetching processing (step S651, step S652) is executed asynchronously with the decryption processing of the decryption processing unit 15. That is, the decryption processing unit 15 transitions to the next processing without waiting for the completion of the pre-fetching processing, and acquires the decryption key that matches the decryption key ID from the decryption key memory unit 154 (step S603).

When the decryption key is successfully acquired from the decryption key memory unit 154 (step S604: YES), the decryption processing unit 15 deletes the acquired decryption key from the decryption key memory unit 154 (updates the offset information when only a part of the byte sequence in the decryption key is acquired) (step S605), and decrypts the encrypted payload part in the encryption chunk by the decryption logic 152 (step S606). The decryption processing unit 15 outputs the decrypted audio and video chunks to the output unit 14 (step S607), and ends the decryption processing.

On the other hand, when the decryption key cannot be acquired from the decryption key memory unit 154 (step S604: NO), the decryption processing unit 15 discards the input data (step S608) and ends the decryption processing.

FIG. 12 is a diagram showing an example of a data table of an encryption chunk generated by the encryption processing unit.

The encrypted payload corresponds to the encryption of audio and video chunks using a random number sequence of encryption keys.

Both the decryption key ID and the offset information are necessary pieces of information for decrypting the encrypted payload. The decryption key ID is the same as the encryption key ID of the encryption key used for encryption, and the offset information specifies the start position in the encryption key of the random number sequence used for encryption. In addition, since the encrypted payload may be encrypted using a random number sequence that concatenates multiple encryption keys, the decryption key ID and the offset information can be specified multiple times, and the data table of the encryption chunk may include count information (the number of decryption key IDs).

The pre-fetching key IDs are encryption keys pre-fetched in the encryption key memory unit 123 of the cryptographic communication application 1 on the transmitting side, and serve as a list of IDs of the decryption keys to be pre-fetched by the cryptographic communication application 1 on the receiving side. At this time, since the list of pre-fetching key IDs can vary in length, the data table of the encryption chunk may include count information (the number of pre-fetching key IDs) to specify the length.

As described above, in the cryptographic communication system 100 of the present embodiment, while benefiting from the improved communication speed by key pre-fetching, there is no need to use a special communication protocol between cryptographic communication applications 1 (e.g., between the cryptographic communication application 1[*a*] and the cryptographic communication application 1[*b*] of FIG. 1). Therefore, the encryption using the encryption key and decryption key shared by quantum key distribution (QKD) technology can be utilized in various communication applications.

In other words, the cryptographic communication system 100 of the present embodiment can achieve high-speed communication by key pre-fetching without requiring a communication protocol or the like for key ID notification.

Incidentally, in the cryptographic communication system 100 of the present embodiment, when the cryptographic communication application 1 on the transmitting side formats the encryption chunk for transmitting the encrypted data and the IDs of the encryption keys used for encrypting the encrypted data to the cryptographic communication application 1 on the receiving side, the cryptographic communication application 1 on the receiving side embeds the IDs of the decryption keys to be pre-fetched. As for the IDs of the decryption keys to be pre-fetched, which are embedded in this encryption chunk, for example, the IDs of the decryption keys to be pre-fetched may be embedded in the encryption chunk so that the IDs of the decryption keys to be pre-fetched are partially duplicated between the encryption chunks transmitted and received sequentially in time.

For example, when an encryption key with encryption key IDs A to F is pre-fetched in the cryptographic communication application 1 on the transmitting side, the encryption key IDs A to D may be embedded in the first encryption chunk, and the encryption key IDs C to F may be embedded in the second encryption chunk. In this case, encryption key IDs C and D out of IDs A to F are duplicated and embedded in two encryption chunks. In this case, when a packet loss occurs in either the first or second encryption chunk, all the IDs of the decryption key to be pre-fetched included in the encryption chunk will not be delivered, but some of the IDs will be recovered by the other encryption chunk.

That is, by adjusting the range and number of key IDs to be embedded, and embedding the same pre-fetching key IDs in multiple encryption chunks, the cryptographic communication system 100 of the present embodiment can reduce the possibility of non-delivery of the pre-fetching key IDs when the cryptographic communication application does not perform retransmission control.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A cryptographic communication system that uses a key management system, which has an interface giving notification of a key ID when providing an encryption key, and returning the encryption key corresponding to the key ID in response to a request for the encryption key for which the key ID is specified, and which shares the encryption key between a first site and a second site by quantum key distribution to execute cryptographic communication between a transmitting device that acquires the encryption key managed by the key management system from the first site and a receiving device that acquires the encryption key managed by the key management system from the second site, wherein the transmitting device includes a processor programmed to:
use the encryption key acquired from the key management system to encrypt plaintext data, acquire the encryption key for encrypting the plaintext data from the key management system before receiving the plaintext data, store the acquired encryption key along with the key ID in an encryption key memory, and generate a packet in which first encrypted data and a first key ID of the first encryption key are stored, and a second key ID of a second encryption key stored in the encryption key memory, which is used for encrypting second plaintext data transmitted after the first plaintext data, is embedded, and the receiving device includes a processor programmed to:

use the encryption key acquired from the key management system to decrypt encrypted data, analyze the packet to read the second key ID, acquire the second encryption key corresponding to the second key ID from the key management system, and store the acquired encryption key along with the key ID in a decryption key memory.

2. The cryptographic communication system according to claim 1, wherein the processor of the transmitting device is further programmed to:

when generating the packet, embed multiple key IDs of the encryption key in the packet, which are used for encrypting plaintext data transmitted after the plaintext data transmitted in the packet, and partially duplicate the multiple key IDs embedded in the packet transmitted at a first timing and the multiple key IDs embedded in the packet transmitted at a second timing following the first timing, and discard the key ID when the corresponding encryption key is stored in the decryption key memory-unit.

3. The cryptographic communication system according to claim 2, wherein the interface conforms to an ETSI GS QKD 014 specification.

4. A cryptographic communication device that acquires an encryption key from a key management system, which has an interface giving notification of a key ID when providing the encryption key, and returning the encryption key corresponding to the key ID in response to a request for the encryption key for which the key ID is specified, and which shares the encryption key between two sites by quantum key distribution to encrypt plaintext data to be transmitted, and that transmits the encrypted data acquired by the encryption, the device comprising a processor programmed to:

use the encryption key acquired from the key management system to encrypt plaintext data;

acquire the encryption key for encrypting the plaintext data from the key management system before receiving the plaintext data;

store the encryption key along with the key ID in an encryption key memory; and generate a packet in which first data generated using a first encryption key to encrypt first plaintext data and a first key ID of the first encryption key are stored, and a second key ID of a second encryption key stored in the encryption key memory, which is used for encrypting second plaintext data transmitted after the first plaintext data, is embedded.

5. The cryptographic communication device according to claim 4, wherein the processor is further programmed to:

embed multiple key IDs of the encryption key in the packet, which are used for encrypting plaintext data transmitted after the plaintext data transmitted in the packet, when generating the packet, and partially duplicate the multiple key IDs embedded in the packet transmitted at a first timing and the multiple key IDs embedded in the packet transmitted at a second timing following the first timing.

6. A cryptographic communication device that acquires an encryption key from a key management system, which has an interface giving notification of a key ID when providing an encryption key, and returns the encryption key corresponding to the key ID in response to a request for the encryption key for which the key ID is specified, and which shares the encryption key between two sites by quantum key distribution to decrypt received encrypted data, the device comprising a processor programmed to:

use the encryption key acquired from the key management system to decrypt encrypted data;

analyze a packet in which first encrypted data that can be decrypted using a first encryption key and a first key ID of the first encryption key are stored, and a second key ID of a second encryption key that can decrypt second encryption data transmitted after the first encryption data, is embedded, to read the second key ID;

acquire the second encryption key corresponding to the second key ID; and store the acquired encryption key along with the key ID in a decryption key memory.

7. The cryptographic communication device according to claim 6, wherein processor is further programmed to discard the first key ID when the encryption key corresponding to the second key ID is stored in the decryption key memory.

8. The cryptographic communication device according to claim 7, wherein the interface conforms to an ETSI GS QKD 014 specification.

9. A cryptographic communication method executed in a cryptographic communication system that uses a key management system, which has an interface giving notification of a key ID when providing an encryption key, and returning the encryption key corresponding to the key ID in response to a request for the encryption key for which the key ID is specified, and which shares the encryption key between a first site and a second site by quantum key distribution to execute cryptographic communication between a transmitting device that acquires the encryption key managed by the key management system from the first site and a receiving device that acquires the encryption key managed by the key management system from the second site, wherein the transmitting device performs a method comprising:

using the encryption key acquired from the key management system to encrypt plaintext data, acquiring the encryption key for encrypting the plaintext data from the key management system before receiving the plaintext data, storing the acquired encryption key along with the key ID, and generating a packet in which first encrypted data acquired by encrypting first plaintext data using a first encryption key and a first key ID of the first encryption key are stored, and a second key ID of second encryption key, which is used for encrypting second plaintext data transmitted after the first plaintext data, is embedded, and the receiving device performs a method comprising:

using the encryption key acquired from the key management system to decrypt encrypted data, analyzing the packet to read the second key ID, acquiring the read second encryption key corresponding to the second key ID from the key management system, and storing the acquired encryption key along with the key ID.

10. A cryptographic communication program applied in a cryptographic communication system that uses a key management system, which has an interface giving notification of a key ID when providing an encryption key, and returning the encryption key corresponding to the key ID in response to a request for the encryption key for which the key ID is specified, and which shares the encryption key between a first site and a second site by quantum key distribution to execute cryptographic communication between a transmitting device that acquires the encryption key managed by the key management system from the first site and a receiving device that acquires the encryption key managed by the key management system from the second site, the program causing the transmitting device to perform a method comprising:

use the encryption key acquired from the key management system to encrypt plaintext data, acquire the encryption key for encrypting the plaintext data from the key management system before receiving the plaintext data, store the acquired encryption key along with the key ID in an encryption key memory, and generate a packet in which first encrypted data that uses a first encryption key to encrypt first plaintext data and a first key ID of the first encryption key are stored, and a second key ID of a second encryption key stored in the encryption key memory, which is used for encrypting second plaintext data transmitted after the first plaintext data, is embedded, and the program causing the receiving device perform a method comprising:

use the encryption key acquired from the key management system to decrypt encrypted data, analyze the packet to read the second key ID, acquire the second encryption key corresponding to the second key ID from the key management system, and store the acquired encryption key along with the key ID in a decryption key memory.

* * * * *